United States Patent
Song et al.

(10) Patent No.: US 7,207,410 B2
(45) Date of Patent: Apr. 24, 2007

(54) APPARATUS AND METHOD FOR ENHANCED IMPACT SENSING

(75) Inventors: Seung-Jae Song, Novi, MI (US); Beverly M Katz, Livonia, MI (US); Faical Tounsi, Lasalle (CA); Thomas W Sacoman, Rochester, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 307 days.

(21) Appl. No.: 10/835,152

(22) Filed: Apr. 29, 2004

(65) Prior Publication Data

US 2005/0242553 A1   Nov. 3, 2005

(51) Int. Cl.
*B60T 7/22* (2006.01)

(52) U.S. Cl. ...................... 180/274; 280/735

(58) Field of Classification Search ................ 180/274, 180/282; 280/735; 701/45; 340/436; 307/10.1
See application file for complete search history.

(56) References Cited

U.S. PATENT DOCUMENTS

| | | | |
|---|---|---|---|
| 3,853,199 A * | 12/1974 | Hirashima et al. .......... | 180/274 |
| 4,995,639 A | 2/1991 | Breed | |
| 5,441,301 A | 8/1995 | Breed et al. | |
| 5,629,681 A | 5/1997 | DuVall et al. | |
| 5,793,005 A | 8/1998 | Kato | |
| 6,009,970 A | 1/2000 | Breed | |
| 6,206,129 B1 | 3/2001 | Breed et al. | |
| 6,234,519 B1 * | 5/2001 | Breed .......................... | 280/735 |
| 6,371,515 B1 * | 4/2002 | Fujishima et al. .......... | 280/735 |
| 6,557,889 B2 * | 5/2003 | Breed .......................... | 280/735 |
| 6,678,599 B2 * | 1/2004 | Eisele et al. .................. | 701/45 |
| 6,882,914 B2 * | 4/2005 | Gioutsos et al. ............. | 701/45 |
| 2002/0013648 A1 * | 1/2002 | Feser et al. ................... | 701/45 |
| 2004/0243294 A1 * | 12/2004 | Miyata et al. ................ | 701/45 |
| 2005/0269809 A1 * | 12/2005 | Gaukel et al. .............. | 280/735 |

* cited by examiner

*Primary Examiner*—Paul N. Dickson
*Assistant Examiner*—Drew J. Brown
(74) *Attorney, Agent, or Firm*—Ralph E. Smith

(57) ABSTRACT

An impact sensing apparatus for a motor vehicle includes a control module having an accelerometer and a contact switch mounted in a bumper of the motor vehicle. The contact switch is in an open position and is in communication with the control module. The control module deploys an airbag when the accelerometer detects a change in velocity of the motor vehicle exceeding a threshold lowered when the contact switch is urged by the bumper to a closed position.

18 Claims, 3 Drawing Sheets

APPARATUS AND METHOD FOR ENHANCED IMPACT SENSING

FIELD OF THE INVENTION

The present invention relates to impact sensing in a motor vehicle, and more particularly to an apparatus and method for enhanced impact sensing in a motor vehicle.

BACKGROUND OF THE INVENTION

It is a regrettable fact that in the day to day operation of a motor vehicle, there is a chance that an impact event may occur. Accordingly, all automobile manufacturers have continuously looked to improve the safety features of motor vehicles. One such safety feature is the airbag, now common in most modern motor vehicles. In order to deploy the airbag, the motor vehicle must know when an impact event is occurring as soon as possible after the start of the impact event.

One common method of determining when an impact event has started is the use of an accelerometer located within the motor vehicle that senses the change in velocity of the motor vehicle. While this device has served very well in the past, a single accelerometer is not efficient at sensing "off-set impacts" (e.g., impacts occurring to a front corner of the motor vehicle). A solution has been to add more accelerometers within the crush zone (e.g., the forward bumper area of the motor vehicle) to detect the impact event. Again, while useful for its intended purpose, these accelerometers do not tend to be consistent between test crashes and are therefore difficult to calibrate. Moreover, during a washout impact wherein the vehicle bottoms out in a puddle thereby jostling the vehicle, a period of time must pass (10 to 15 milliseconds) to determine if the accelerometers are reading an impact event that would require airbag deployment or whether a puddle impact has occurred. Accordingly, efforts have been made to reduce the time needed to distinguish between impact events and puddle impacts or any other impact not requiring deployment of the airbag.

SUMMARY OF THE INVENTION

An impact sensing apparatus for a motor vehicle comprises a control module having an accelerometer and a contact switch mounted in a bumper of the motor vehicle in an open position, the contact switch in communication with the control module. When the contact switch is urged by said bumper to a closed position, the control module lowers an airbag deployment threshold and deploys an airbag in response to the accelerometer detecting a change in velocity of the motor vehicle exceeding the threshold.

In a further embodiment, the contact switch is mounted within the bumper such that a low speed impact can close the contact switch. The low speed impact can be below a threshold that would require airbag deployment.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
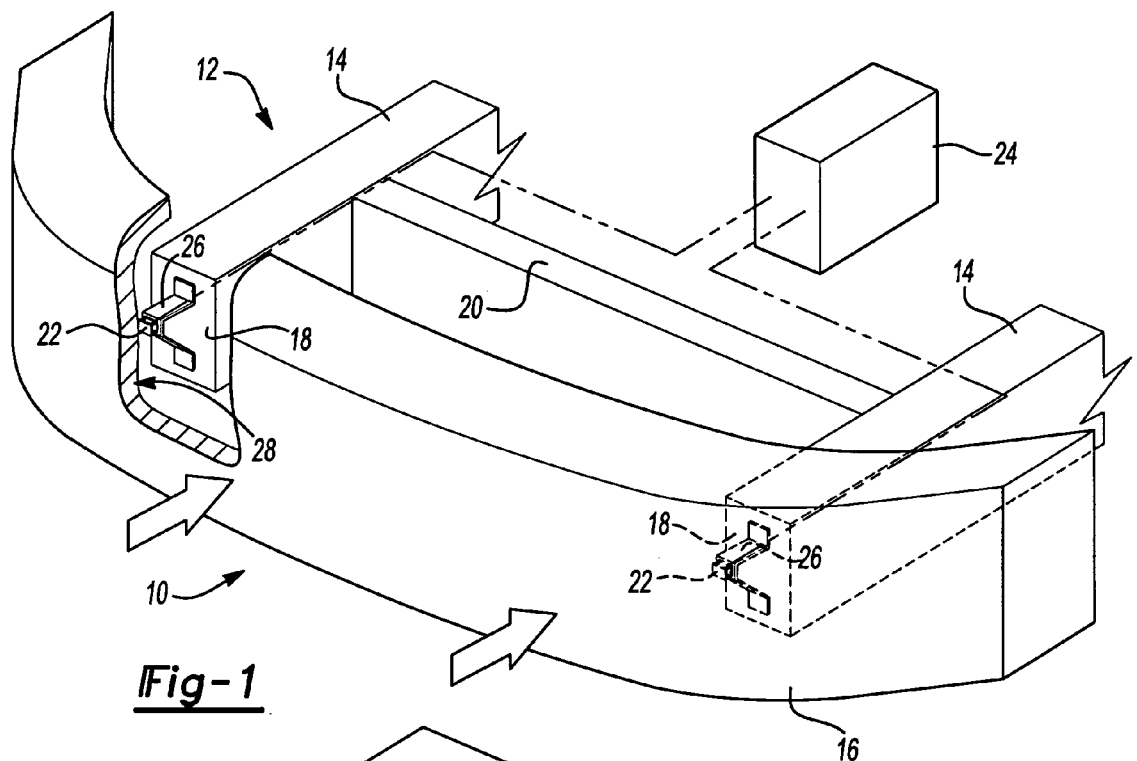
FIG. 1 is a perspective view of the front end of an exemplary motor vehicle having impact sensors according to the invention.

With reference to FIG. 1, an impact sensing apparatus 10 is shown in operative association with the front end of a motor vehicle 12. The motor vehicle 12 generally includes a pair of frame rails 14 and a bumper 16. The bumper 16 is mounted to rail tips 18 of the frame rails 14. A cross member 20 extends parallel to the bumper 16 between the frame rails 14.

Figure 2:
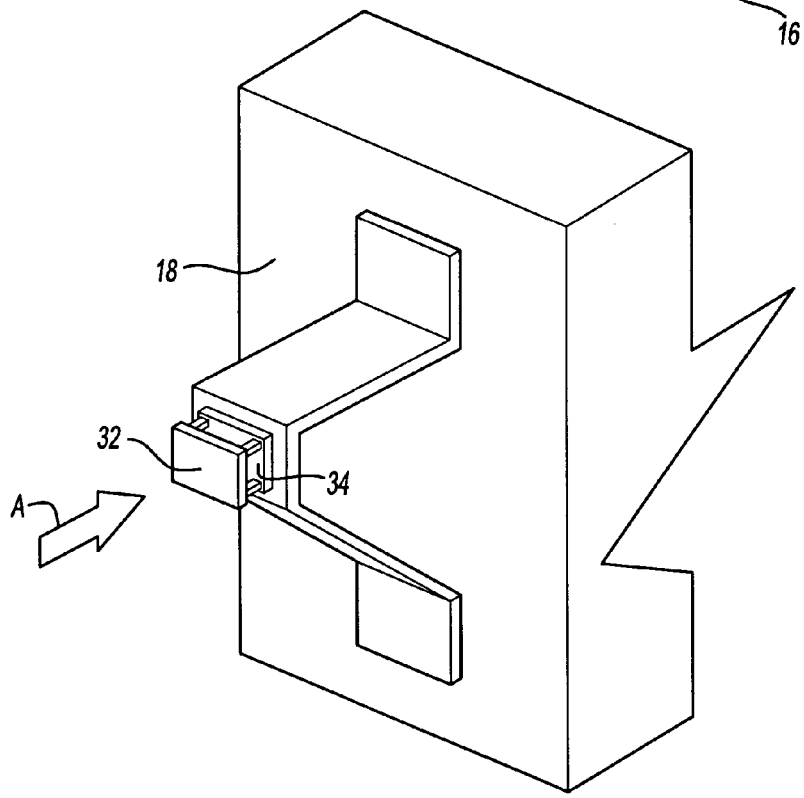
FIG. 2 is an enlarged perspective view of an impact sensor of FIG. 1.

The impact sensing apparatus 10 generally includes a pair of contact switches 22 in electronic communication with a main control module 24. While in the particular example provided, two contact switches 22 have been illustrated, as many as desired may be employed. The contact switches 22 are mounted within the bumper 16. Turning briefly to FIG. 2, the contact switches 22 are preferably mounted on a mounting bracket 26 behind an inner surface 28 of the bumper 16. It is anticipated that the contact switches 22 are mounted such that a minimal impact, as low as 5 mph, that might cause displacement of the bumper, will cause the contact switch to close.

The mounting bracket 26 is preferably in line with the frame rail 14 and mounted near the rail tip 18 thereof. The contact switch 22 generally includes a first portion 32 and a second portion 34. In a normal state, the contact switch 22 is in an open position such that the first portion 32 and the second portion 34 are not in electrical contact with one another. The first portion 32 is located very close to or in contact with the inner surface 28 of the bumper 16. When in the opened position, the contact switch 22 does not return a signal to the main control module 24.

The main control module 24 also receives input from an accelerometer (not shown). The accelerometer can be located within the control module 24 or in another remote location, and is used to detect a change in velocity of the motor vehicle 12. During an impact event, the inner surface 28 of the bumper 16 moves in the direction of arrow A, thereby urging the first portion 32 of the contact switch 22 to contact the second portion 34 of the contact switch 22, thereby allowing current to flow through the contact switch 22. The main control module 24 reads the electrical current and accordingly knows that the bumper 16 has been displaced sufficiently to close the contact switch 22, and that an impact event has occurred or is occurring.

Figure 3:
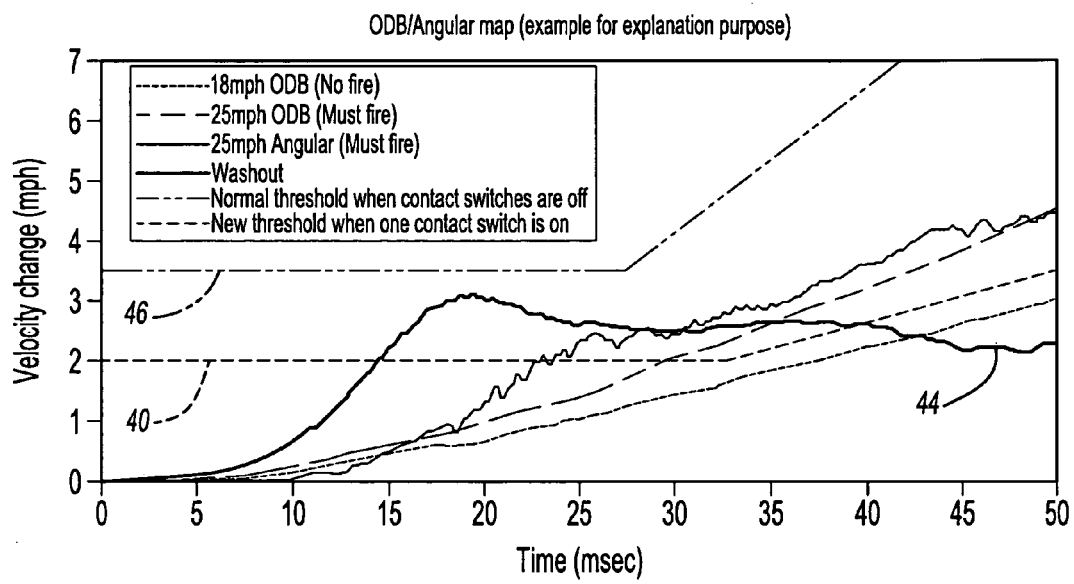
FIG. 3 is an exemplary graph illustrating the effect of the impact sensor of the invention on airbag deployment requirements during an angular or off center impact.
Figure 4:
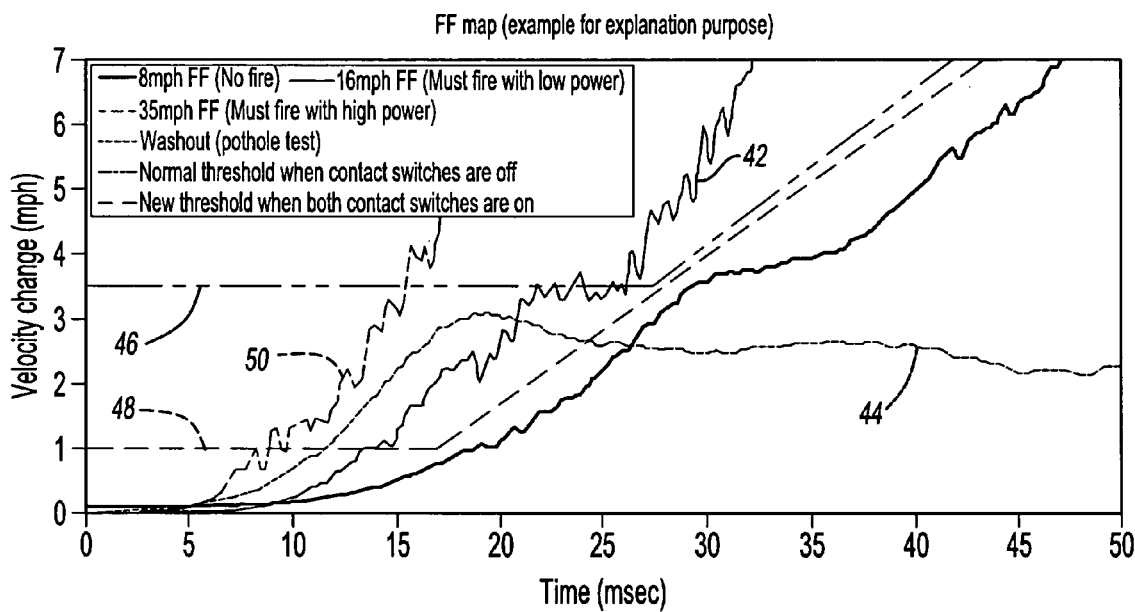
FIG. 4 is an exemplary graph illustrating the effect of the impact sensor of the invention on airbag deployment requirements during a full frontal impact.

FIGS. 3 and 4 provide examples of deceleration profiles for various impact and non-impact events, as communicated to the control module 24 by the accelerometer, for illustration purposes only. Each graph charts change in the velocity of the motor vehicle (Y axis) versus time in milliseconds (X axis). A default threshold line 46 is used by the control module 24 to determine when an airbag should be activated, but must be set high enough such that a non-impact event, such as a washout represented by line 44, does not activate the airbag.

Accordingly, due to the level of the default threshold line 46, an impact requiring a low power activation (see line 42 in FIG. 4) generates a change in velocity of the motor vehicle that will not deploy the airbag until approximately 25 milliseconds after impact. A higher velocity impact, represented by line 50 in FIG. 4, triggers airbag deployment after approximately 15 milliseconds. The control module can adopt lower threshold 48 upon activation of both sensors 22. In the illustrated example, the lowered threshold allows the control module 24 to reduce the response times of 25 and 15 milliseconds cited above to less than 15 and 10 milliseconds, respectively. With reference to FIG. 3, by adopting the lower threshold line 40 upon activation of one sensor, the control module 24 can be told to react to the deceleration profile of an offset/angular impact without the risk of inadvertent activation in response to washout 44.

Figure 5:
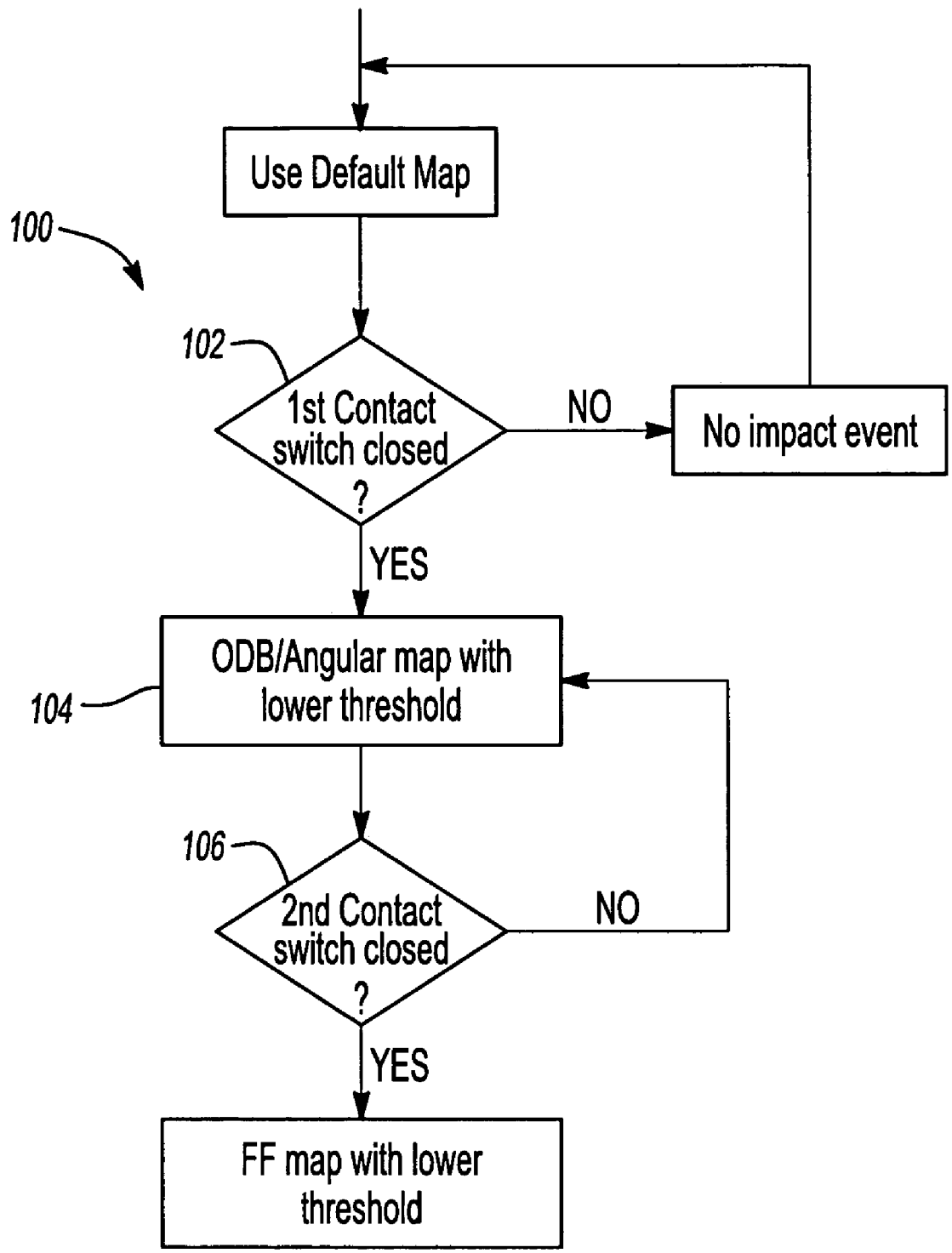
FIG. 5 is a flowchart illustrating the effect of the impact sensors on airbag deployment control logic.

Turning now to FIG. 5, a method of controlling airbag deployment using input from the impact sensing apparatus 10, generally indicated by reference number 100, will now be described. With no input from the contact switches 22, control module will use the default map represented by line 46 of FIGS. 3–4.

At step 102, it is first determined whether a first contact switch 22 is closed. If no contact switch is closed, no impact event has occurred and the threshold line 46 remains at its position shown in FIGS. 3 and 4. Accordingly, a washout (non-impact, line 44) will not activate the airbag.

If, however, a first contact switch 22 is closed, then an impact event has occurred and vehicle decelerations higher than line 40 should activate the airbag. Accordingly, at step 104, the main control module 24 uses the offset/angular deployment map (FIG. 3) and the threshold line 46 is lowered to a new threshold line 40. The threshold for airbag activation can be lowered because now that there has been an impact, the control module 24 can react to an early change in relative velocity of the motor vehicle that otherwise might have been due to a washout event indicated by line 44.

If at step 106, it is determined that a second contact switch 22 has closed, then the main control module 24 knows that a full frontal impact is occurring. Accordingly, the airbag deployment map in FIG. 4 is used and the first threshold line 46 is changed to the new threshold line 48. Again, the main control module 24 can react to an earlier, lower velocity change because the possibility of a washout event 44 has been eliminated, thereby allowing the earlier deployment of an airbag in response to an impact event.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An impact sensing apparatus for a motor vehicle comprising:
   a control module having an accelerometer; and
   a first contact switch mounted in a bumper of the motor vehicle in an open position, said first contact switch in communication with said control module;
   a second contact switch mounted in a bumper of the motor vehicle in an open position, said second contact switch in communication with said control module;
   wherein upon one of said contact switches being urged by said bumper to a closed position, said control module lowers an airbag deployment threshold and deploys an airbag in response to said accelerometer detecting a change in velocity of the motor vehicle exceeding said threshold.

2. The impact sensing apparatus of claim 1, wherein at least one of said contact switches is mounted within said bumper such that a low speed impact can close said at least one contact switch.

3. An impact sensing apparatus for a motor vehicle comprising:
   a control module having an accelerometer; and
   a contact switch mounted in a bumper of the motor vehicle in an open position, said contact switch in communication with said control module;
   wherein upon said contact switch being urged by said bumper to a closed position, said control module lowers an airbag deployment threshold and deploys an airbag in response to said accelerometer detecting a change in velocity of the motor vehicle exceeding said threshold,
   wherein said contact switch is mounted within said bumper such that a low speed impact can close the contact switch, and
   wherein the low speed impact lies below a threshold that would require airbag deployment.

4. The impact sensing apparatus of claim 3, wherein the low speed impact is a 5 mph impact.

5. The impact sensing apparatus of claim 2, wherein said threshold indicates a change in velocity of the motor vehicle beyond which said airbag must deploy.

6. The impact sensing apparatus of claim 2, wherein said threshold indicates a rate of change in velocity of the motor vehicle beyond which said airbag must deploy.

7. The impact sensing apparatus of claim 1, wherein said threshold indicates a change in velocity of the motor vehicle beyond which said airbag must deploy.

8. The impact sensing apparatus of claim 1, wherein said threshold indicates a rate of change in velocity of the motor vehicle beyond which said airbag must deploy.

9. An impact sensing apparatus for a motor vehicle comprising:
   a control module having an accelerometer; and
   two contact switches mounted in a bumper of the motor vehicle, each contact switch being in a first position and in communication with said control module;
   wherein said control module lowers an airbag deployment threshold to a first threshold line when one of said contact switches is urged by said bumper to a second position, and
   wherein said control module lowers an airbag deployment threshold to a second threshold line when both of said contact switches are urged by said bumper to a second position.

10. The impact sensing apparatus of claim 9, wherein at least one of said two contact switches is mounted within said bumper such that a low speed impact can urge said at least one contact switch to a second position.

11. The impact sensing apparatus of claim 10, wherein the low speed impact lies below a threshold that would require airbag deployment when said two contact switches remain in said first position.

12. The impact sensing apparatus of claim 11, wherein the low speed impact is a 5 mph impact.

13. The impact sensing apparatus of claim 9, wherein said airbag deployment threshold indicates a change in velocity of the motor vehicle beyond which said airbag must deploy.

14. The impact sensing apparatus of claim 9, wherein said airbag deployment threshold indicates a rate of change in velocity of the motor vehicle beyond which said airbag must deploy.

15. The impact sensing apparatus of claim 9, further comprising:
   one or more additional contact switches mounted in the bumper of said motor vehicle, each additional contact switch being in a first position and in communication with said control module;
   wherein said control module lowers the airbag deployment threshold to a separate threshold line when each additional contact switch is urged by said bumper to a second position.

16. In a motor vehicle having a safety system for deploying an airbag when motion of the motor vehicle exceeds a specified airbag deployment threshold, a method for impact sensing comprising the steps of:
   lowering the airbag deployment threshold to a first level when a first contact switch mounted in a bumper of said motor vehicle is urged by said bumper from a first position to a second position; and
   lowering the airbag deployment threshold to a second level when a second contact switch mounted in the bumper of said motor vehicle is urged by said bumper from a first position to a second position.

17. The method for impact sensing of claim 16, wherein the first contact switch is mounted within the bumper such that the step of lowering the airbag deployment threshold to said first level occurs at a low speed impact that lies below the specified airbag deployment threshold.

18. The method for impact sensing of claim 17, wherein the low speed impact is a 5 mph impact.

* * * * *